C. B. YOUNT.
MEANS FOR MEASURING LIQUIDS.
APPLICATION FILED MAR. 19, 1920.

1,386,083.

Patented Aug. 2, 1921.
3 SHEETS—SHEET 1.

INVENTOR,
Clarence B. Yount,
BY Howard L. Smith,
his ATTORNEY.

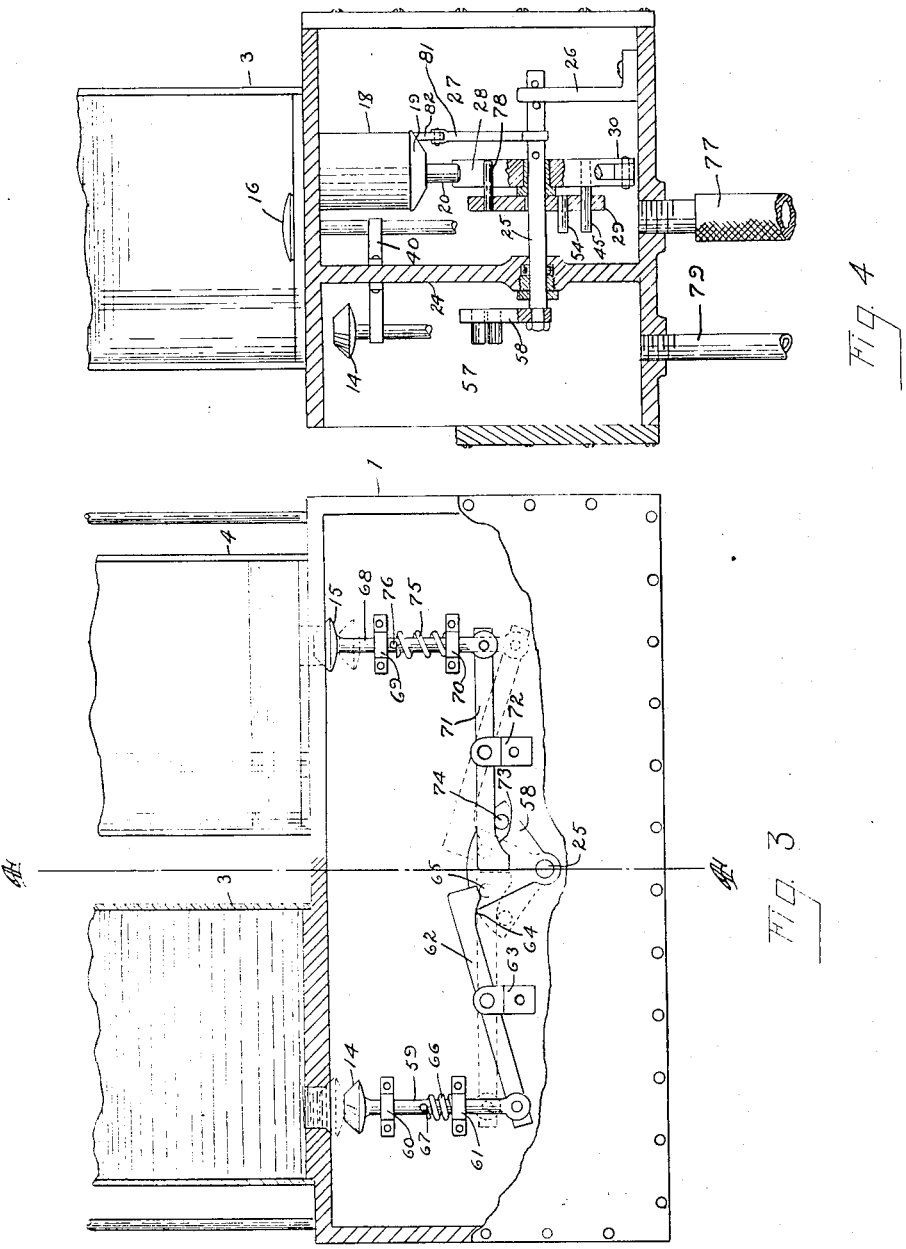

C. B. YOUNT.
MEANS FOR MEASURING LIQUIDS.
APPLICATION FILED MAR. 19, 1920.

1,386,083.

Patented Aug. 2, 1921.
3 SHEETS—SHEET 3.

INVENTOR.
Clarence B. Yount,
BY Howard J. Smith
His ATTORNEY.

UNITED STATES PATENT OFFICE.

CLARENCE B. YOUNT, OF MONTGOMERY COUNTY, NEAR UNION, OHIO.

MEANS FOR MEASURING LIQUIDS.

1,386,083.  Specification of Letters Patent.  Patented Aug. 2, 1921.

Application filed March 19, 1920. Serial No. 367,120.

*To all whom it may concern:*

Be it known that I, CLARENCE B. YOUNT, a citizen of the United States, residing in the county of Montgomery, near the town of Union, State of Ohio, have invented certain new and useful Improvements in Means for Measuring Liquids, of which the following is a specification.

The principal object of my invention is to provide means for accurately and conveniently measuring liquids. My device is particularly adapted for use in gasolene filling stations where it is necessary to measure gasolene and oils with great accuracy. It may also be used advantageously in dairies and other places where liquids are measured.

My improved device is simple in construction and efficient in operation, and may be constructed at relatively small cost. Other important and incidental objects will be brought out in the following specification and particularly set forth in the subjoined claims.

Figures 1, 2:
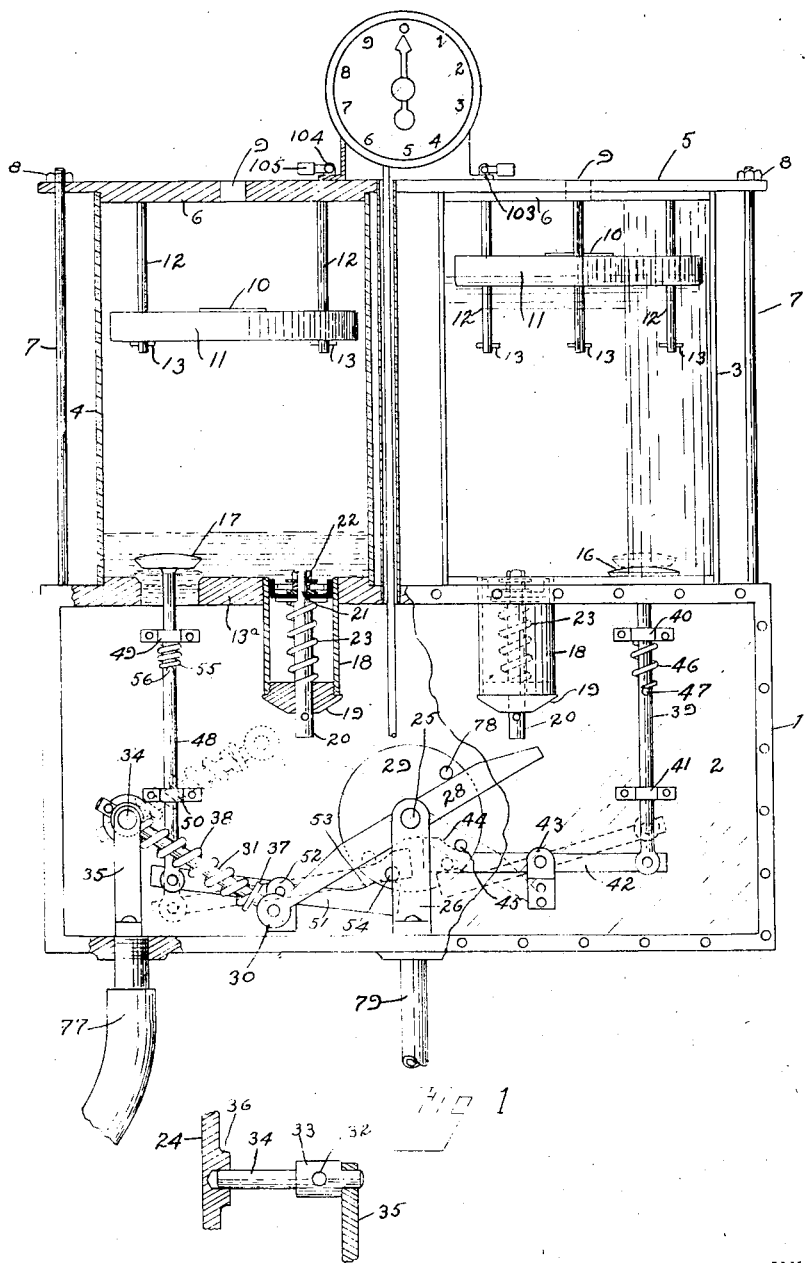
Figure 5:
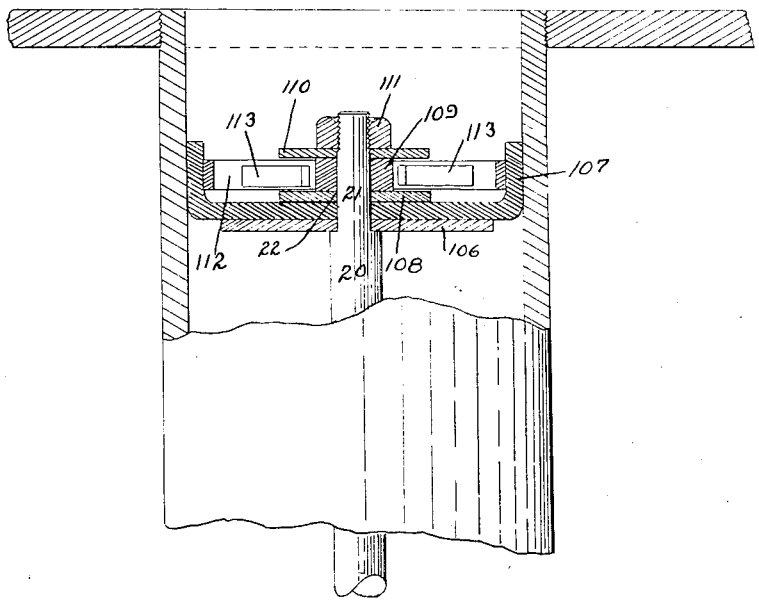
Figure 6:
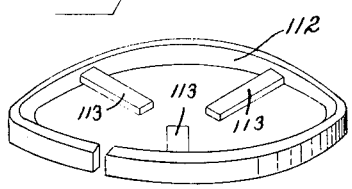

One form of embodiment of my invention is illustrated in the accompanying drawings, of which Figure 1 is a side elevational view, partly in section, of my improved liquid measuring device. Fig. 2 is a detail end view of the means which pivotally support one end of the spring-encircled operating rod. Fig. 3 is view, partly in section, of that side of my measuring device that contains the inlet-valve operating mechanism. Fig. 4 is an end view, in section, on the line 4—4 of Fig. 3 of my measuring device, showing the mechanism for operating the inlet and outlet valves. Fig. 5 is a side view, partly in section, of the plunger operating mechanism for the valves. And Fig. 6 is a perspective view of the split ring for the plungers, to prevent the liquid from leaking past them.

Throughout the specification and drawings, similar reference characters denote corresponding parts.

Referring to the accompanying drawings, the numeral 1 designates a liquid-receiving tank preferably constructed of metal. This tank is preferably rectangular in cross section, with a plate glass 2 constituting its front portion to reveal the valves and operating mechanism therefor.

Supported on top of the receiving tank 1 are two glass jars 3 and 4, although they may be vessels constructed of other material.

The jars that I prefer, each have a capacity of one gallon. A cover plate 5 which has projections 6, 6 that fit into the tops of the jars, is drawn down tightly upon them by rods 7 secured at their lower ends to the top of the tank 1 and threaded at their upper ends to receive nuts 8. (See Fig. 1.)

Above the middle portion of each jar 3 and 4, there is provided in the cover plate 5 a hole 9 open to the atmosphere. This hole is adapted to be closed by a leather seat 10 on a float 11 vertically movable within each of the jars along guide rods 12 that project downwardly into the jars from the cover plate 5 and having in their lower ends transverse stop pins 13 that limit the downward movement of the float. (See Fig. 1.)

Provided in the top 13ª of the tank 1 which forms the bottom of the jars, is a liquid inlet and a liquid outlet for each of them. As shown in Figs. 1, 3 and 4, the inlet opening in one jar is in approximate alinement with the inlet opening in the companion jar, the outlet openings in the jars being similarly disposed and also being opposite their respective inlet openings. The inlet opening in the jar 3 is closed from below by a puppet valve 14, while the inlet opening in the jar 4 is similarly closed by a puppet valve 15. (See Fig 3.) The outlet opening for the jar 3 is closed from above by a puppet valve 16, while the outlet opening for the jar 4 is similarly closed by a puppet valve 17. (See Fig. 1.)

For the purpose of admitting liquid to one jar until full, and withdrawing it from the other jar until empty, the following means are provided for alternately operating the inlet and outlet valves. Projecting downwardly from an opening in the bottom for each jar, at one side of the outlet opening therein, is a cylinder 18 into the lower end of which is threaded a head 19 through a central hole in which there loosely projects a rod 20 having a reduced upper end 21 which projects through a plunger 22. (See Figs. 1 and 5.) The construction of this plunger will be hereinafter more specifically described. Encircling the rod 20 between the plunger and the head 19 of the cylinder, is a coil spring 23. When a jar is filled with liquid and the float 11 is carried upwardly thereby to close the opening 9 to the atmosphere, the downward pressure of the liquid will be sufficient to overcome the tension of the spring 23, whereupon the plunger 22 will be forced downwardly by the liquid to perform a function now to be described.

Referring to Fig. 4, the tank 1 is longitudinally divided into two compartments by a partition 24, through a hole in which there projects one end of a transverse shaft 25, the other end of which is journaled in a bracket 26 secured to the bottom of the compartment of the tank 1 to which liquid is admitted when the valve 16 is raised, this compartment being the larger of the two. Within the larger compartment, which will be designated by the numeral 27, there is loosely mounted upon the shaft 25 a rocker arm 28, each end of which is adapted, when raised to its uppermost position, to be engaged by the lower end of a respective rod 20.

Fast on the shaft 25, between the rocker arm 28 and the partition 24, is a disk 29. Pivotally secured to the enlarged end 30 of the rocker arm 28, is one end of rod 31 whose other end projects loosely through a hole 32 in a block 33 fast on a rotatable shaft 34, one end of which is journaled in a bracket 35 secured to the bottom of the compartment 27, while its other end is received by a transverse hole in a boss 36 on the partition 24. Encircling the rod 31 between a flange 37 on the rod 31, and the block 33, is a coil spring 38 for a purpose soon to be described. (See Figs. 1 and 2.)

Referring to Fig. 1, the puppet valve 16 has a long stem 39 which passes through bracket guides 40 and 41, terminating at its lower end in an enlarged portion that is pivotally secured to one end of a rocker arm 42. The latter is pivotally secured at its middle portion to a bracket 43, and terminates at its inner end in a foot portion having a curved surface 44 that is adapted to be engaged by one end of a pin 45 that projects horizontally through the disk 29, the other end of said pin projecting into the path of descent of the end of the rocker arm 28 at the right of the bracket 26 in Fig. 1. A coil spring 46 encircling the stem 39 between the bracket 40 and a pin 47 on the valve stem 39, normally presses down upon said pin to hold the valve 16 upon its seat as shown in Fig. 1.

Referring again to Fig. 1, the puppet valve 17 has a long stem 48 that passes through bracket guides 49 and 50, terminating at its lower end in an enlarged portion which is pivotally secured to one end of a rocker arm 51. The latter is pivotally secured at its middle portion to a bracket 52, and terminates at its inner end in a foot portion having a curved surface 53 against which a pin 54 in the disk 29, is adapted to press when the disk is turned counterclockwise, to raise the outlet valve 17 to the position shown in Fig. 1, against the tension of a spring 55 that encircles the stem 48 between the bracket 49 and a pin 56 on the said stem 48. Until the disk is rotated in a reverse direction, the outlet valve 17 will be held in the above position to permit the egress of liquid from the jar 4, since the pin 54 is above the top flat end portion of the rocker arm. (See Fig. 1.)

When the outlet valve 17 is held above, and the outlet valve 16 upon, its seat, the inlet valve 15 will be held against, and the inlet valve 14 below, its seat by the following means. Referring to Figs. 3 and 4, there is secured to the end of the shaft 25 which projects into the inlet valve compartment 57, a sector 58. The inlet valve 14 has a stem 59 which projects downwardly through two guide brackets 60 and 61, terminating at its lower end in an enlarged portion which is pivotally secured to one end of a rocker arm 62. The latter is pivotally secured at its middle portion to a bracket 63, and terminates at its inner end in a foot portion having a curved surface 64 in contact with which a pin 65 is adapted to travel when the sector is turned clockwise, to draw the inlet valve 14 down to the position shown in Fig. 3, against the tension of a spring 66 that encircles the stem 59 between the bracket 61 and a pin 67 on said stem. Until the sector 58 is rotated in a reverse direction, the valve 14 will be held in the above position to admit liquid to the jar 3, since the pin 65 is below the bottom flat end portion of the rocker arm. (See Fig. 3.)

Referring again to Fig. 3, the inlet valve 15 has a stem 68 which projects downwardly through two guide brackets 69 and 70, terminating at its lower end in an enlarged portion which is pivotally secured to one end of a rocker arm 71. The latter is pivotally secured at its middle portion to a bracket 72, and terminates at its inner end in a foot portion having a curved surface 73 in contact with which a pin 74 on the sector 58 is adapted to travel when the sector is rotated counterclockwise, to draw the valve stem 68 downwardly against the tension of a coil spring 75 that encircles said stem between a pin 76 on it, and the bracket 70. The inlet valve 15 is thus held against its seat to prevent the ingress of liquid to the vessel 4 so long as the outlet valve 17 is above the outlet opening.

In operation, when the jar 3, for example, is filled with liquid to the amount of one gallon, the float 11 will have been raised to close the opening 9 to the atmosphere and the lower end of the rod 20 pushed downwardly by the plunger 22 to engage the rocker arm 28 and move it slightly past a horizontal position. The upward movement of the enlarged end of the rocker arm 28 to this position, will compress the spring 38 sufficiently to cause the latter to kick that end of the rocker arm to the position shown in dotted lines in Fig. 1. This will cause the other end of the rocker arm 28 to strike the outer end of the pin 45 on the disk 29, and rotate said disk sufficiently to cause the other end of said pin to travel along the curved surface 44 of the rocker arm 42. This will raise the outlet valve 16 against the tension of the spring 46, a sufficient distance above its seat to permit the liquid to flow from the jar 3 into the outlet compartment 27 of the tank 1 from which it may be withdrawn through an outlet tube 77.

When the disk 29 is thus turned by the rocker arm 28, the pin 54 will move clockwise a sufficient distance to permit the end of the rocker arm 51 below it to ascend under the pressure of the spring 55 on the valve stem 48 pivotally connected to its other end. The outlet valve 17 on the stem 48 will thus be drawn against its seat to close the outlet opening in the vessel 4 while liquid is permitted to rush into the latter above the inlet valve 15, which will simultaneously be drawn downwardly by the rocker arm 71. This result is effected by the sector 58 which, being on the same shaft 25 as the disk 29, will move the pin 74 counter-clockwise to raise the inner end of the rocker arm and lower its other end to draw the stem 68 of the valve 15 downwardly. When the sector 58 is thus moved, the pin 65 will be carried thereby a sufficient distance toward the bracket 61 to permit the spring 66 to force the inlet valve 14 against its seat. The inlet opening in the vessel 3 is thus closed to the admission of liquid until all of the latter in the vessel is permitted to pass therefrom by the raised outlet valve 16.

Now, when the vessel 4 is filled with liquid to the amount of one gallon, the opening 9 will be closed by the float 11 and the plunger 22 depressed to cause the lower end of the rod 20 to engage and move downwardly the enlarged end of the rocker arm 28 to a position slightly beyond its horizontal one. The spring 38 will then force it the rest of the way to cause the other end of the rocker arm 28 to engage a pin 78 on the disk 29 for the purpose of rotating the latter counterclockwise a sufficient distance to reverse the positions of all the valves through the mechanism hereinbefore described. The liquid will then be permitted to flow from the vessel 4 into the compartment 27 of the tank 1, and liquid will be simultaneously admitted to the vessel 3 past the lowered inlet valve 14 in the compartment 57 of said tank, liquid being admitted to the latter through an inlet pipe 79. During the ascending and descending movement of the enlarged end of the rocker arm 28, the rod 31 is permitted a free pivotal and longitudinal movement to compress the spring 38 by reason of the block and shaft construction shown in Fig. 2.

For the purpose of preventing liquid passing between the cylinder wall and the piston 22, the latter is constructed as follows. Referring to Figs. 5 and 6, there rests upon the shoulder formed between the rod 20 and its reduced upper portion 21, a washer 106 upon which rests a cup leather 107 that works in contact with the cylinder wall. Above the cup leather 107 is a washer 108 upon which rests a collar 109 that surrounds the rod's reduced portion 21, a washer 110 being pressed against this collar by a nut 111 threaded on the upper end of the reduced portion of said rod 20. Fitted within the cup leather 107 is a split metallic expansion ring 112 that has inwardly projecting fingers 113 whose inner ends fit loosely between the washers 108 and 110, to prevent the ring from slipping off. A plunger unit is thus provided in which the cup leather is held in firm contact with the cylinder wall at all times to prevent the leakage of liquid past it.

Having described my invention, I claim:

1. In a device of the type described, the combination with a liquid measuring vessel having an outlet opening, of a liquid receiving tank below said vessel with which said outlet opening communicates, a valve adapted to open and close said opening, a rocker arm, means operatively connected between said rocker arm and valve to open the latter when one end of the rocker arm is depressed, means actuated by the liquid in the vessel, when full, to depress one end of said rocker arm slightly beyond a horizontal position, and resilient means connected to the other end of said rocker arm, for throwing the latter to an extreme position to open the outlet valve after the first named end of said rocker arm has been depressed by the liquid actuating means slightly beyond a horizontal position.

2. In a device of the type described, the combination with a liquid measuring vessel having an outlet opening, of a liquid receiving tank below said vessel with which said outlet opening communicates, a rocker arm, a puppet valve adapted to be raised above said opening by the rocker arm when one end of the latter is depressed, a plunger actuated by the weight of the liquid in the vessel, when full, to depress one end of said rocker arm slightly beyond a horizontal position, and resilient means connected to the other end of said rocker arm, for throwing the latter to an extreme position to raise the puppet valve above said opening, after the first named end of the rocker arm has been depressed by the plunger slightly beyond a horizontal position.

3. In a device of the type described, the combination with a liquid measuring vessel having an outlet opening, of a liquid receiving tank below said vessel with which said outlet opening communicates, a valve adapted to open and close said opening, a rocker arm, means operatively connected between said rocker arm and valve to open the latter when one end of the rocker arm is depressed, means actuated by the weight of the liquid in the vessel, when full, to depress one end of said rocker arm slightly beyond a horizontal position, a rod pivotally connected to the other end of said rocker arm, a rotatable shaft, a member fast on said shaft containing a hole through which the free end of said rod is movable, a projection on the inner end of said rod, and a spring encircling said rod between said projection and the member on said shaft, adapted to be compressed when the rocker arm is moved to a horizontal position by the liquid actuated means, and to force the rocker arm to an extreme position for the purpose specified when it has been moved beyond a horizontal position by said liquid actuated means.

4. In a device of the type described, the combination with a liquid measuring vessel having an outlet opening, of a liquid receiving tank below said vessel with which said outlet opening communicates, a rocker arm, a puppet valve normally adapted to cover said opening, a downwardly projecting stem on said valve, a second rocker arm pivotally connected to the lower end of said stem, a shaft upon which the first rocker arm is loosely mounted, a member fast on said shaft, an element on said member in the path of descent of one end of the first rocker arm, and adapted to engage and depress the inner end of the second rocker arm, and means adapted to engage the first rocker arm when the vessel is filled with liquid, to depress one end of said first rocker arm sufficiently to engage and move the element on the shaft member, and through it to depress the inner end of the second rocker arm for the purpose of raising the valve above said opening.

5. In a device of the type described, the combination with a liquid measuring vessel having an outlet opening, of a liquid receiving tank below said vessel with which said outlet opening communicates, a rocker arm, a puppet valve normally adapted to cover said opening, a downwardly projecting stem on said valve, a second rocker arm pivotally connected to the lower end of said stem, a shaft upon which the first rocker arm is loosely mounted, a disk fast on said shaft, a pin passing transversely through said disk, one end of which is in the path of descent of one end of the first rocker arm, and the other end of which is adapted to depress the inner end of the second rocker arm when the disk is turned, and means adapted to engage the first rocker arm when the vessel is filled with liquid, to cause the last named rocker arm to engage said pin to move the disk a sufficient distance to cause said pin to depress the inner end of the second rocker arm for the purpose of raising the valve above said opening.

6. In a device of the type described, the combination with a liquid measuring vessel having an outlet opening in its bottom portion and an opening to the atmosphere in its top portion, of a liquid receiving tank below said outlet opening, a cylinder depending from the bottom of said vessel and in communication therewith, a valve, means for raising the latter above said outlet opening, a float adapted to be raised by the liquid in the vessel to close the opening to the atmosphere, and a plunger in said cylinder adapted to be depressed by the weight of the liquid therein to engage the valve raising means to raise the valve above the outlet opening, when the opening in the top portion of the vessel is closed by the float.

7. In a device of the type described, the combination with a liquid measuring vessel having a liquid inlet and a liquid outlet opening in its bottom portion, a liquid receiving tank below said openings, divided into two compartments, the inlet opening communicating with one compartment and the outlet opening communicating with the other compartment, an inlet valve for the inlet opening and an outlet valve for the outlet opening, a transverse shaft projecting into each compartment, a rotatable member fast on said shaft in one compartment, a rocker arm loose on said shaft in the same compartment, adapted to engage and turn the rotatable member in either direction, means operatively connected with said shaft in each compartment to open one valve and close the other when the rotatable member is moved in either direction, and means adapted to be actuated when the vessel is filled with liquid, to engage and move the rocker arm a sufficient distance to effect the above result for the purpose specified.

8. In a device of the type described, the combination with a liquid measuring vessel having a liquid inlet and a liquid outlet opening in its bottom portion, a liquid receiving tank below said openings, divided into two compartments, the inlet opening communicating with one compartment and the outlet opening communicating with the other compartment, an inlet valve below the inlet opening and an outlet valve above the outlet opening, a stem projecting downwardly from each valve, a separate rocker arm for each valve, having its outer end pivotally connected to the valve stem, a transverse shaft projecting into each compartment, a disk fast on said shaft in one compartment, a rocker arm loose on said shaft in the same compartment, a pin passing through said disk, one end of which is adapted to engage and depress the inner end of the rocker arm for the outlet valve to raise the latter, and the other end of said pin adapted to be engaged by the loose rocker arm when said arm is depressed, to turn the disk, a rotatable member fast on the shaft in the other compartment, a pin on said member adapted to engage and depress the inner end of the rocker arm for the inlet valve to press it against its seat when the outlet valve is raised, and means adapted to be actuated when the vessel is filled with liquid, to depress one end of the rocker arm on the shaft to turn the disk a sufficient distance to open one valve and close the other.

9. In a device of the type described, the combination with a liquid measuring vessel having a liquid outlet opening, of a valve for normally closing said opening, a rocker arm for raising said valve above the opening when one end of said rocker arm is depressed, a cylinder in communication with said vessel, a cup leather in said cylinder adapted to be moved downwardly by the liquid in said vessel, when filled, a rod whose lower end is adapted to engage and move downwardly one end of said rocker arm to raise said valve, a reduced portion on the other end of said rod projected through said cup leather, a collar surrounding the reduced portion of said rod, a washer above and below said collar, a washer between the cup leather and the shoulder formed at the point on said rod where its reduced portion begins, a nut threaded on the top end of said rod, a split ring adapted to press outwardly against the upturned wall of said cup leather, and radial fingers projecting inwardly from said split ring into the space between the washers that grip said collar, for the purpose specified.

In testimony whereof I have hereunto set my hand this 17th day of March, 1920.

CLARENCE B. YOUNT.

Witness:
HOWARD S. SMITH.